Figure 3:
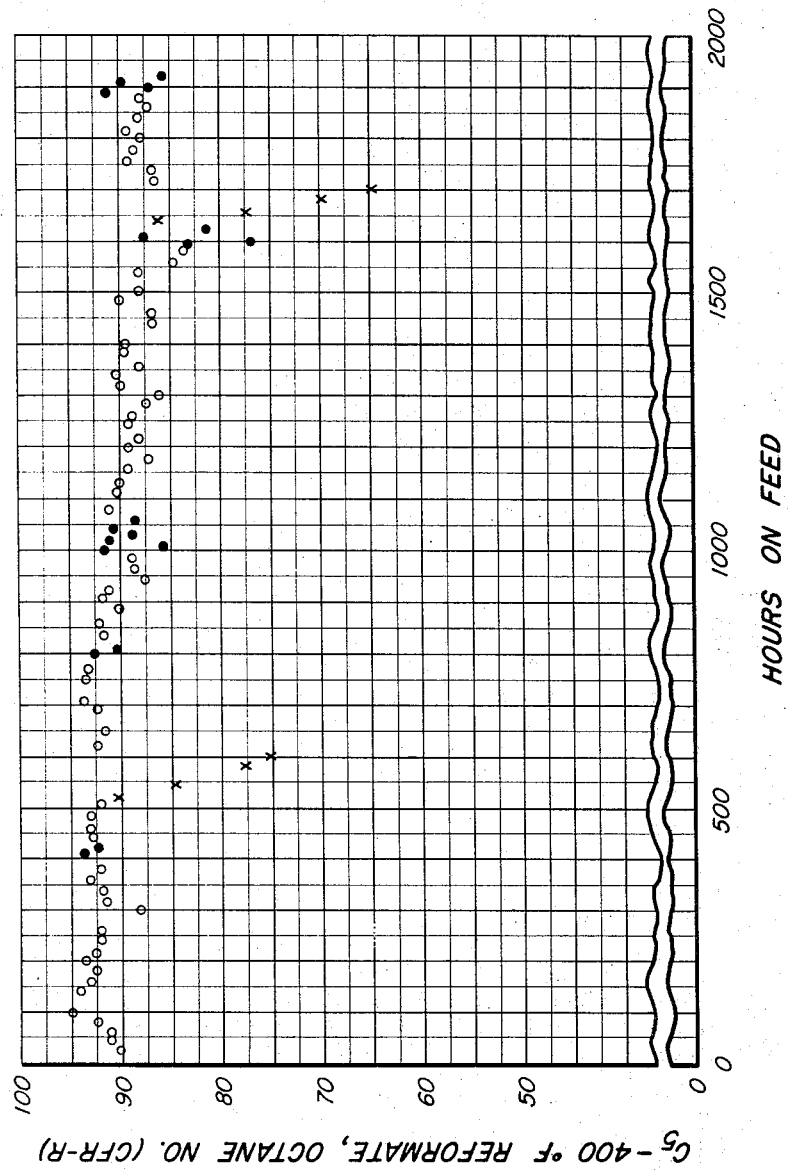

Sept. 26, 1967    B. L. EVERING ETAL    3,344,060
OXIDATIVE REACTIVATION OF PLATINUM HYDROFORMING CATALYSTS
Filed July 30, 1956    3 Sheets-Sheet 1
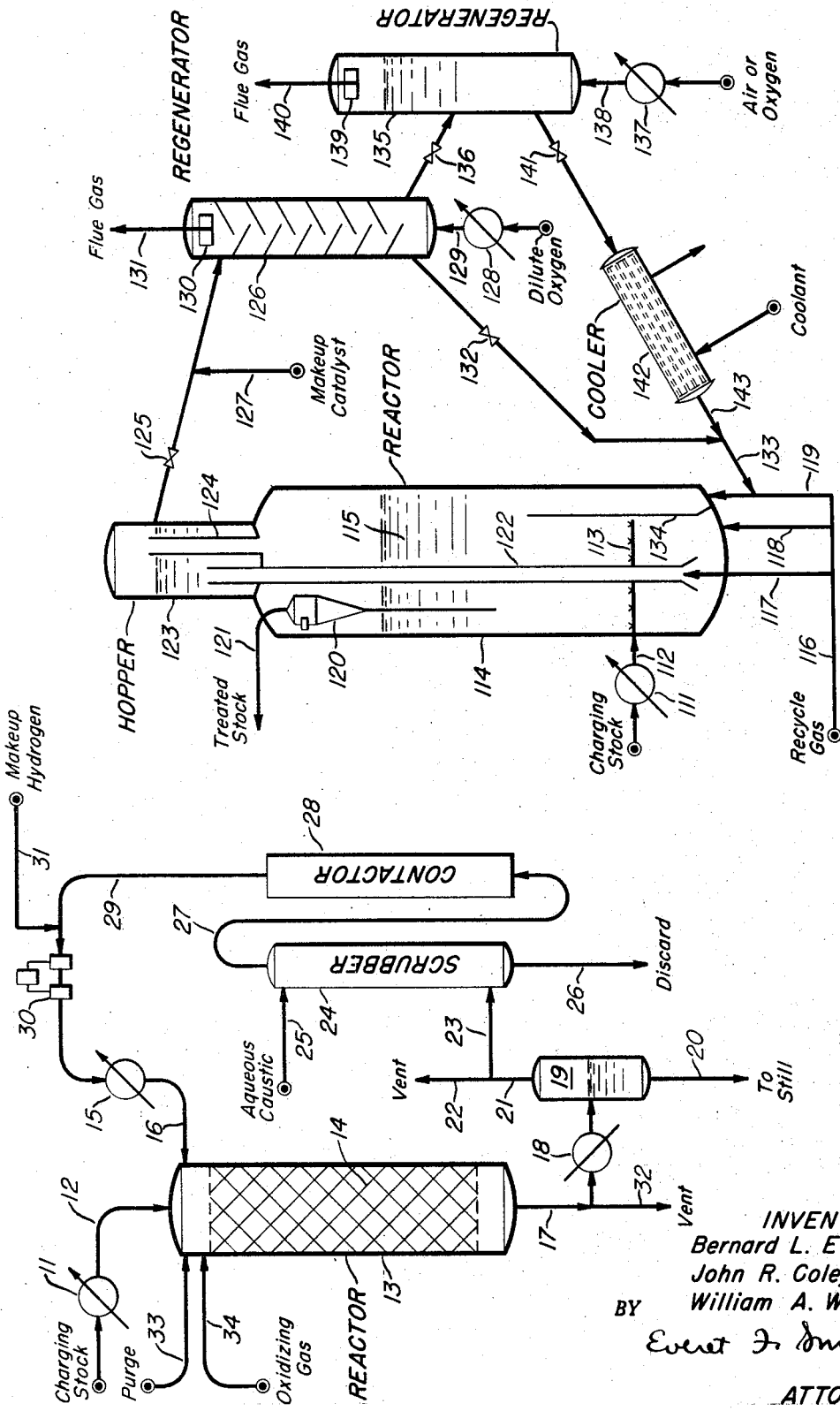
INVENTORS:
Bernard L. Evering
John R. Coley
William A. Wilson
BY Everet F. Smith
ATTORNEY United States Patent Office 3,344,060
Patented Sept. 26, 1967

3,344,060
OXIDATIVE REACTIVATION OF PLATINUM HYDROFORMING CATALYSTS
Bernard L. Evering, Chicago, Ill., and John R. Coley, Gary, and William A. Wilson, Griffith, Ind., assignors to Standard Oil Company, Chicago, Ill., a corporation of Indiana
Filed July 30, 1956, Ser. No. 601,073
11 Claims. (Cl. 208—140)

This application is a continuation-in-part of application Ser. No. 292,294, filed June 7, 1952, now abandoned.

This invention relates to the reactivation of platinum-containing catalysts after deactivation and carbonization thereof in the hydroforming of hydrocarbons and it pertains more particularly to the problem of gradual loss of activity and loss of activity maintenance normally caused by accumulation of refractory carbon during a long series of on-stream and regeneration cycles.

The so-called "hydroforming" process, in its original form, employed a molybdena-alumina catalyst under conditions of elevated temperature and pressure for the reforming of hydrocarbons in the presence of hydrogen, and produced results that were greatly superior to the prior-art processes in terms of product quality. The yield-octane relationship, however, left something to be desired, and the catalyst became carbonized and deactivated very rapidly, so that frequent regeneration was necessary. These shortcoming of the process have been remedied to some extent by the recent development of platinum-type alumina-supported hydroforming catalysts. The new catalysts are capable of producing a substantially improved yield-octane relationship, and some of them are capable of producing substantially continuous operation for extended periods of time, when operated with carefully chosen charging stocks and rigidly controlled conditions of temperature, pressure, and space velocity. Among the catalysts of the new type are the halogen-containing platinum-alumina of Vladimir Haensel, described in U.S. Patent 2,479,-109 (Aug. 16, 1949) and the silica-alumina supported platinum and palladium catalysts of Frank G. Ciapetta, described in U.S. Patent 2,550,531 (Apr. 24, 1951). All of the various catalysts, however, ultimately become deactivated by one mechanism or another, presumably by degradation, masking, or poisoning of the active centers, and we have observed that after a long series of on-stream and regeneration cycles they cannot be fully restored to their initial activity or activity-maintenance by any of the techniques commonly employed for the revivification of hydroforming catalysts in general or of platinum catalysts in particular.

Another disadvantage of platinum-type catalysts lies in their unfortunate behavior pattern with respect to yield, selectivity, and carbonizing tendency over a range of pressures. At high reactor pressures in the range of about 500 to 750 pounds per square inch (hydrogen partial pressures above about 350 pounds per square inch), these catalysts have long on-stream lives (months) if the hydroformer feed stock is carefully selected; however, at a given octane level the yield of reformate is low compared to the yield obtainable at reactor pressures around 200 pounds per square inch. At the lower pressures, on the other hand, platinum-type catalysts maintain their superior activity and selectivity for only relatively short periods (hours or days); consequently, at such pressures a regenerative process must be used. It appears therefore that for the most advantageous utilization of platinum-type catalysts, a low-pressure hydroforming process should be used, coupled with an adequate method for reactivating the exhausted catalyst.

According to the prior art, platinum hydroforming catalysts may be regenerated by oxidation of the carbon therefrom at an elevated temperature not exceeding 1200° F., followed by hydrogen treatment of the carbon-depleted catalyst. Examples of such known regeneration processes are described in U.S. 2,664,404 and 2,641,582, but it should be noted that the prior art did not recognize the problem of gradual loss of activity and loss of activity maintenance which is caused by accumulation of refractory carbon during a prolonged series of on-stream and regeneration cycles. Prior techniques are ineffective as a practical matter for maintaining both selectivity and activity for long periods of time, i.e. for weeks or months, particularly when the spent catalysts are heavily carbonized. We have conducted an extensive study of the oxidative regeneration of platinum-type hydroforming catalysts, and have found that the oxygen-treatment of a typical carbonized platinum catalyst containing much in excess of 0.1 percent by weight of carbon at temperatures substantially above 900° F. soon results in the serious impairment or total destruction of its hydroforming activity, particularly if heavily carbonized catalyst is contacted with a gas of high oxygen partial pressure. It appears therefore that the prior art did not recognize the critical steps and conditions necessary for obtaining a long, useful catalyst life in a regenerative platinum catalyst naphtha hydroforming system.

We have now discovered a new technique whereby platinum-alumina hydroforming catalyst, and the various modifications thereof, can be successfully maintained at a high level of activity and selectivity during exposure to hydrocarbon charging stocks under hydroforming conditions. Such catalysts, containing carbon in excess of 0.1 percent by weight, can be reactivated by oxidation if the catalyst temperature during the oxidation is maintained above about 750° F. but not greatly higher than the recrystallization temperature (around 860° F.) of the platinum, and we have discovered that the said reactivation is greatly facilitated and improved if the oxidation is carried out before the carbon content of the catalyst reaches a level substantially greater than about 1 percent by weight. Thus, our invention broadly comprises the steps of subjecting a deactivated platinum catalyst containing above 0.1 percent and preferably below about 1 percent by weight of carbon to a mild oxidation with a dilute oxygen stream at a temperature above about 750° F. and below 900° F. to remove oxidizable carbon therefrom without destroying the active catalyst centers. In other words, the on-stream periods should be sufficiently short to obtain the advantage of initial high catalyst activity in the absence of excessive coke deposit; by short, we mean of the order of 20 hours or about 1 day as distinguished from the long on-stream periods of weeks or months heretofore employed in commercial platinum catalyst hydroformers. The catalyst, after suitable purging steps, is thereafter subjected to contact with a hydrogen-containing gas at a temperature within the hydroforming range, and is thereby restored to substantially its initial activity and selectivity and to approaching its initial capacity for maintaining its activity and selectivity during further contact with the charging stock.

In the reactivation of platinum hydroforming catalysts by repeated oxidations as described above, we have observed that the proportion of refractory or difficultly oxidizable carbon remaining on the catalyst during the initial cycles is below about 0.01 percent by weight, but tends gradually to increase with succeeding cycles. For best results in the reactivation, we have discovered that the proportion of residual carbon should not be allowed to build up beyond a level of about 0.05 to 0.1 percent by weight. The removal of such carbon would ordinarily be a difficult problem, owing to the sensitivity to higher temperatures normally exhibited by such catalysts. We have further discovered, however, that after the catalyst has been reactivated under the conditions set forth above, it is less sensitive to oxidation at higher temperatures, and that the residual carbon can be substantially completely removed therefrom by a further oxidative treatment under more severe conditions of temperature, oxygen concentration, and/or contact time, as set forth more fully below. In this supplemental oxidative treatment, we find that the activity and regenerability of the catalyst are in large part restored to their initial levels.

Our invention constitutes a method for reactivating a carbonized platinum hydroforming catalyst while simultaneously removing carbon therefrom without damage to the active catalytic centers. Our invention further constitutes a method for minimizing the build-up of residual or difficulty oxidizable carbon on such catalysts and for removing such carbon therefrom wholly or in part.

One object of our invention is to effect an improvement in the reforming of hydrocarbons. Another object is to effect an improvement in catalysts for the hydroforming of hydrocarbons. A further object is to effect an improvement in the hydroforming of hydrocarbons with platinum hydroforming catalysts under coke-forming conditions. A specific object is to provide a means for the reactivation of platinum-alumina hydroforming catalysts, and variants thereof. A further specific object is to reactivate deactivated platinum hydroforming catalysts more effectively and to permit their reuse in the hydroforming process. A subsidiary object is to remove carbon from platinum hydroforming catalysts without damage to the catalytic centers present within such catalysts. A further subsidiary object is to remove residual or accumulated carbon of refractory or difficulty oxidizable nature from supported platinum hydroforming catalysts. A further subsidiary object is to remove from platinum hydroforming catalysts any materials of unknown composition which tend to mask the active centers present therein. Another object is to increase the useful life of platinum hydroforming catalysts. Other objects of our invention and its advantages over the prior art will be apparent from the present description thereof and from the appended claims.

In our primary oxidation step, a deactivated and carbonized platinum-containing hydroforming catalyst containing in excess of 0.1 percent but preferably less than 1 percent by weight of carbon is contacted with dilute oxygen while being maintained at a temperature above about 750° F. but not greatly above the recrystallization temperature (around 860° F.) of the platinum, suitably above 750 and below about 900° F. and preferably between about 825 and 850° F. The regenerating gas may be air, which is preferably diluted to some extent with flue gas or an inert gas such as nitrogen to an oxygen content between about 0.5 and 20 percent, preferably below 10 percent or about 0.5 to 2 percent. We ordinarily employ an oxygen partial pressure between about 0.1 and 100 pounds per square inch, preferably between about 1 and 50 pounds per square inch, the higher oxygen partial pressures being employed at the lower temperatures and lower carbon contents. A contact time between about 0.2 and 5 hours is ordinarily sufficient to reduce the proportion of carbon to less than about 0.05 percent by weight and to produce an effective reconditioning of the catalyst. In fixed-bed reactors, we prefer to operate at a contact time between about 1 and 5 hours, whereas in fluidized-catalyst systems we prefer to operate at considerably shorter contact times, of the order of one minute or less up to one hour. The proportion of residual carbon varies somewhat according to the oxidation time and conditions and also according to the age of the catalyst. Fresh catalyst, for example, is readily oxidized to a carbon level around 0.01 percent, whereas during 1750 hours on stream in a cyclic hydro-forming process employing our primary reactivation procedure at 20-hour intervals, we have found that the catalyst builds up and retains somewhat more than 0.05 percent by weight of refractory carbon. The oxygen-treated catalyst can be returned immediately to service in the hydroforming process, wherein it will automatically receive a hydrogen treatment effective to restore any oxidized platinum centers. Preferably, the oxygen-treated catalyst is subjected to a purge with an inert gas and thereafter to a treatment with a hydrogen-containing gas at a temperature within the hydroforming range, suitably 600 to 1000° F. and preferably 850 to 950° F., prior to being returned to use in the hydroforming process.

In its preferred form, our process periodically includes a supplemental oxidation step, in which the treated catalyst from the primary oxidation step, after accumulating around 0.05 to 0.1 percent by weight of residual, difficulty oxidizable or "refractory" carbon, is further oxidized under more severe conditions to remove the residual carbon therefrom. The said supplemental oxidation can be effected by prolonging the oxidation time for a period substantially longer than required for regeneration, for example to 24 hours, 36 hours, or more, by increasing the oxygen concentration in the treating gas or otherwise increasing the oxygen partial pressure (e.g. by operating at higher than atmospheric pressure but not higher than about 500 p.s.i.), and/or by raising the temperature 10° F. or more, preferably 25° F. or more, above the primary oxidation level, suitably as high as 925° F. We prefer to use air as the regeneration gas in this step, optionally diluted with flue gas or inert gas to an oxygen content between about 10 and 20 percent. Substantially all of the oxidizable carbon is removed by this treatment, and the catalyst is ordinarily left with a carbonaceous residue of less than about 0.01 percent by weight. The treated catalyst is thereafter purged and subjected to contact with hydrogen as set forth above.

Figure 4:
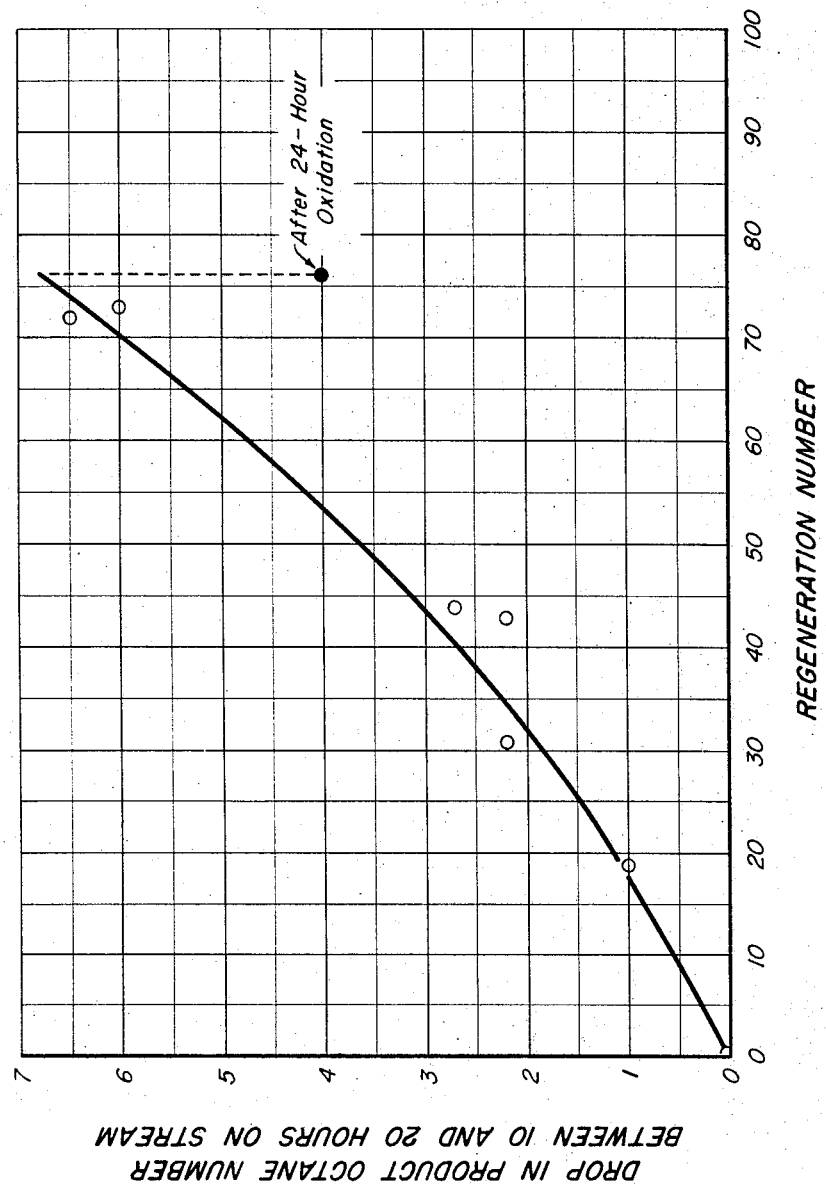

The invention will be more clearly understood from the specific examples hereinafter described in connection with the accompanying drawings which form a part of this specification and in which:

FIGURE 1 is a schematic flow diagram of a fixed bed system for practicing the invention, FIGURE 2 is a schematic flow diagram of a fluid system for practicing the invention, and FIGURE 3 is a chart showing the gradual activity decline encountered during a long period of repeated cycles of on-stream and regeneration, FIGURE 4 is a chart showing the advantage attained.

FIGURE 1 illustrates an embodiment of our invention in a typical hydroforming process employing a fixed-bed reactor. A charging stock is vaporized in heater 11 and introduced through line 12 into the top of reactor 13. The charging stock is a conventional hydroforming feed, which may be a naphtha having a boiling range extending from 100 to 400° F. or even somewhat higher, owing to the reactivation feature of our process. Ordinarily a charging stock boiling within the range of about 200 to 380° F. is used. The reactor is packed with a pelleted platinum-alumina catalyst 14, preferably based on a Heard-type alumina gel, as described in Reissue Patent 22,196 (Oct. 6, 1942). The catalyst is prepared by commingling with the said gel a suspension of platinum sulfide equivalent to about 0.1 to 2 percent by weight, preferably about 0.6 percent, of platinum, calculated on the basis of dry $Al_2O_3$, and thereafter drying, crushing, pelleting, drying, and calcining. Other catalysts may be employed as described herein, comprising other supporting materials and other forms of platinum, optionally with additional catalytic components. A recycle gas stream comprising essentially hydrogen is also introduced through heater 15 and line 16 into the top of reactor 13. The mixture of charging stock and recycle gas flows downward through the catalyst bed, where the hydroforming reactions are carried out at a temperature between about 800 and 1000° F., preferably between about 850 and 950° F., a pressure between about 50 and 500 pounds per square inch, preferably around 200 pounds per square inch, a hydrogen rate of 1,000 to 10,000 standard cubic feet per barrel of charging stock, and an hourly weight space velocity of 0.5 to 5. The reaction products emerge from the bottom of the reactor through line 17 and cooler 18 to knockout drum 19, from which the liquid products are withdrawn through line 20 to a conventional distillation system (not illustrated), and the product gas is withdrawn through line 21. The product gas is essentially hydrogen, with small proportions of paraffins, olefins, hydrogen sulfide, carbon oxides, water, and other impurities. A portion of the gas may be vented through line 22 as required to hold the reactor pressure down to the desired level and to avoid any accumulation of impurities. The remainder may be led through line 23 into the bottom of scrubber column 24, where it is washed with aqueous caustic, aqueous alkali, aqueous amines, or the like, introduced into the top of the scrubber through line 25, to remove carbon dioxide, hydrogen sulfide, and/or other acidic components of the gas stream. The exhausted scrubber solution emerges from the bottom of the scrubber through line 26, and is discarded or treated by conventional means to recover the components thereof and/or to regenerate the treating solution. The purified gases which emerge from the top of scrubber 24 through line 27 may then be led into contactor 28, where they can be treated with activated carbon, silica gel, activated alumina, clay, or other surface-active solid to remove olefinic hydrocarbons and water. Alternatively they may be contacted with a liquid solvent for olefins, such as a high-boiling hydrocarbon, phenol, sulfuric acid, phosphoric acid, or the like, and may thereafter be dried by conventional means, if necessary. It is contemplated that a multiplicity of contactors 28 may be used, to permit periodic reactivation of catalyst in each of the reactors separately. The product gas, now substantially free of significant impurities, emerges through line 29 and is recycled through compressor 30, heater 15, and line 16 to the top of reactor 13. Makeup hydrogen may be added if required through line 31 to line 29.

During the hydroforming cycle, the catalyst in reactor 13 gradually loses activity and accumulates carbon, so that its average carbon level ordinarily exceeds 0.1 percent by weight after 10 to 20 hours on stream. Before the carbon level reaches or substantially exceeds about 1 percent (i.e. after an on-stream period which does not substantially exceed 1 day), the catalyst is removed from on-stream conditions, and is subjected to reactivation according to our process. The flow of charging stock and recycle gas is stopped. The reactor is depressured through lines 17 and 32, and is purged of charging stock and hydrogen by means of flue gas or an inert gas introduced into the top of the reactor through line 33. A stream of air, diluted with flue gas or nitrogen to an oxygen content between about .5 and 20 percent, preferably about .5 to 2 percent, is then introduced at atmospheric or somewhat elevated pressure up to about 500 p.s.i. and at a space velocity around 1,000 volumes per volume of catalyst-filled reactor space per hour into the top of the reactor through line 34. The dilute oxygen stream flows downward through the catalyst bed, which is maintained at a temperature above about 750 and below 900° F. by means of cooling tubes (not shown). Carbon is burned from the catalyst by this means, and is ordinarily reduced to a level below about 0.05 percent by weight in a treating time of about 1 to 5 hours. Flue gas leaves the bottom of the reactor through lines 17 and 32. The proportion of carbon dioxide in the flue gas is a convenient indication of the extent of reactivation. When the proportion of carbon dioxide in the flue gas drops abruptly or reaches a level of around 0.1 percent, the primary reactivation is substantially complete. The catalyst is finally purged with flue gas introduced through line 33, the reactor is repressured with hydrogen or recycle gas, the catalyst is exposed to hydrogen or recycle gas at around 800 to 1000° F. for a period of 0.1 to 1 hour, and the hydroforming cycle is resumed, the catalyst being now restored to substantially its original levels of activity and selectivity and to its original capacity for maintaining its activity and selectivity.

When, after a series of primary reactivations as described above, the residual carbon level of the catalyst after reactivation has built up to 0.05 percent by weight or slightly higher, we then subject the catalyst to a secondary or supplemental reactivation under more severe conditions. In the supplemental reactivation, we prefer to increase the oxygen content of the reactivating gas, e.g. to a level between about 10 and 20 percent, raise the catalyst temperature at least 10° F., preferably about 25° F., or more, to a level preferably between about 875 and 925° F., and subject the catalyst to the new conditions for an additional period of at least about 1 to 24 hours. As in the regeneration step, the total pressure in this supplemental reactivation may be above atmospheric and up to about 500 p.s.i. After this treatment, the catalyst ordinarily contains less than about 0.01 percent by weight of carbon and exhibits substantially improved activity maintenance when the hydroforming cycle is resumed.

FIGURE 2 illustrates an embodiment of our invention employing a fluidized-catalyst system. A charging stock is vaporized in heater 111 and introduced through line 112 and sparger or grating 113 into a lower part of reactor 114. The reactor is charged with a finely divided catalyst 115 of such particle size as to permit satisfactory fluidization. The catalyst may suitably be platinum-alumina, platinum-titania-alumina, or the like, as described elsewhere herein. The catalyst is fluidized by means of the vaporized charging stock and by means of recycle gas, predominantly hydrogen, introduced into the reactor through lines 116, 117, 118, and 119. The recycle gas also serves to strip hydrocarbons from the catalyst in the lower part of the reactor, prior to withdrawal of the catalyst for reactivation. The hydroforming reaction is carried out at a temperature between about 850 and 950° F., a pressure between about 50 and 500 pounds per square inch, preferably around 200 pounds per square inch, a hydrogen rate of 2,000 to 10,000 standard cubic feet per barrel of charging stock, an hourly weight space velocity of 0.5 to 5, and an average holding time for the catalyst within the reactor between about 1 and 24 hours, i.e. short enough to prevent deposition of large amounts of carbonaceous deposits thereon. The catalyst-to-oil ratio is fixed by the above definition of space velocity and catalyst holding time. The vaporous reaction products pass from the reactor through cyclone system 120 and line 121 to a conventional recovery system (not illustrated), an important feature of which is the separation and return of the product gas (essentially hydrogen) as recycle gas through line 116. The recycle gas is preferably purified, before being recycled, as described above in connection with FIGURE 1.

Catalyst is withdrawn continuously from reactor 114 at a rate adjusted to give the desired holding time in the reactor, to keep the catalyst activity and selectivity at the desired level, and to produce an average coke level on the catalyst particles in excess of 0.1 percent by weight and less or not substantially more than about 1 percent. Withdrawal is effected by gas-lift from the bottom of the reactor, recycle gas flowing through line 117 into the bottom of riser 122 and upward, carrying with it a quantity of catalyst into hopper 123, wherein the catalyst is disengaged and from which the gas stream returns through downcomer 124 to the free space at the top of the reactor.

The withdrawn catalyst flows from hopper 123 through valved line 125 into regenerator 126, makeup catalyst being added as required through line 127. The regenerator is preferably a cascade-type plate column, so that a countercurrent contact between catalyst and oxidizing gas can be achieved, avoiding any intermixing of treated and untreated catalyst within the regenerator, and permitting the withdrawal of fully treated catalyst from the bottom. Within regenerator 126, the catalyst flows downward countercurrent to a stream of dilute oxygen at a temperature preferably between about 825 and 850° F., a contact time between about 0.5 and 10 minutes, and a pressure approximately the same as in reactor 114, between about 50 and 500 pounds per square inch. The temperature may be maintained within the desired limits by an internally mounted waste-heat boiler, not shown. The regenerating gas, introduced through heater 128 and line 129, is air, which may be diluted to some extent with flue gas or an inert gas such as nitrogen to an oxygen content between about 0.5 and 20 percent, preferably about 2 to 10 percent. Flue gas leaves the regenerator through ceramic filters 130 and line 131. The treated catalyst, preferably containing less than about 0.02 percent by weight of residual carbon, emerges in part from a lower portion of regenerator 126 through valved line 132, and is recycled through lines 133 and 119 to reactor 114. The recycled catalyst is introduced into a lower portion of the reactor, segregated by baffle 134, wherein it is fluidized and reduced by recycle gas flowing through line 119, and is commingled thereby with the main body of the catalyst within the reactor. Baffle 134 may be extended if desired to the top of the dense-phase catalyst bed, or an equivalent internal or external conduit may be substituted therefor.

On continued use, the catalyst tends to lose activity and selectivity, even though subjected to the reactivation conditions employed in regenerator 126, owing, we believe, to a tendency to accumulate difficulty oxidizable carbon. This effect is minimized and the catalyst is maintained at more nearly constant activity and residual carbon level by diverting a portion of the treated catalyst from regenerator 126 through line 136 to a second regenerator 135, where it is subjected to a supplemental regeneration under more severe conditions. The proportion of catalyst thus withdrawn ordinarily ranges from about 1 to 20 percent or more of the catalyst oxidized under mild conditions. Regenerator 135 may be a conventional unit containing a single bed of fluidized solids, or it may be a cascade-type plate column, or the like. Within the regenerator, the catalyst is subjected to a temperature 10° F. or more higher than the temperature in regenerator 126, preferably between about 875 and 925° F., a pressure approximately the same as in regenerator 126 (50 to 500 pounds per square inch), and a holding time between about 0.1 and 36 hours, preferably 12 to 24 hours, varying inversely with the temperature employed. The temperature may be held at the desired level by an internal waste-heat boiler, not shown. Provision may be made, if desired, for externally recycling the catalyst from the bottom of the top of the regenerator. Regeneration gas enters the bottom of regenerator 135 through heater 137 and line 138. This gas is air which may or may not be diluted with flue gas or inert gas to give an oxygen content ranging from 0.5 to 20 percent, preferably 10 to 20 percent. Treating gas leaves the regenerator through ceramic filters 139 and line 140. The regenerated catalyst, ordinarily containing less than about 0.01 percent carbon, emerges from a lower portion of regenerator 135 through valved line 141, and is recycled through cooler 142 and lines 143, 133, and 119 to reactor 114.

While FIGURES 1 and 2 describe the application of our new process to the treatment of fixed-bed and fluidized catalysts, it will be apparent that the process is equally applicable to the regeneration of other forms of platinum catalysts, employed in other types of catalytic apparatus. For example, the catalyst can be used in the form of a moving bed, in which the charging stock and catalyst are preferably passed in countercurrent flow, and the exhausted catalyst is withdrawn and regenerated according to our technique, preferably also in a moving bed. Other alterations and modifications will be apparent to those skilled in the art.

Our process is applicable broadly to the reactivation, or revivification of carbonized hydroforming catalysts containing platinum as the essential component thereof. Such catalysts are generally supported upon a base consisting essentially of alumina, silica-alumina, or alumina plus a third component such as a fluoride, a chloride, boria, titania, chromia, an oxide of phosphorus, vanadia, or the like. The platinum is commonly employed in a proportion between about 0.1 and 2 percent by weight, based on the dry supporting material, preferably about 0.6 percent. Additional components, such as those of the group set forth above, are commonly employed in the proportion of about 0.1 to 10 percent by weight, based on dry $Al_2O_3$. Catalyst prepared from chloroplatinic acid will of course contain approximately the same amount of chloride as platinum on a weight basis even though the alumina support contains no combined chloride.

In the preparation of a typical hydroforming catalyst which, after being deactivated and carbonized during exposure to a hydrocarbon charging stock under hydroforming conditions, is capable of being regenerated according to our process, a mixture of platinum and alumina is prepared, and the mixture is dried and calcined. The alumina can be employed in any of a large variety of forms, such as alumina hydrosol, alumina hydrogel, alumina xerogel, alumina monohydrate, sintered alumina, and the like, all of which can be prepared according to methods described in the prior art. The alumina should preferably be in substantially pure form, and in particular should not include iron, manganese, nickel, cobalt, or compounds thereof. The alumina is commingled with platinum in the form of a platinum compound such as chloroplatinic acid, platinum tetrachloride, or the like, or a solution thereof, or preferably a stable colloidal suspension of a platinum sulfide. To this mixture may optionally be added a third component of the group set forth above, or a compound affording such a component. The mixture of catalyst components is optionally dried in part, suitably at a temperature between about 200 and 400° F. for a period between about 4 and 24 hours, and is then calcined at a temperature between about 800 and 1200° F. for around 2 to 8 hours or more. Alternatively, the catalytic mixture can be contacted with hydrogen or a hydrogen-containing gas at a temperature between about 300 and 600° F. for about 4 to 12 hours or more prior to the said calcining step, or the calcining step itself can be carried out in the presence of hydrogen or a hydrogen-containing gas. As a further alternative, the effect of the calcining treatment can be achieved during the utilization of the catalyst at elevated temperature and pressure in the hydroforming of hydrocarbons.

Hydroforming catalysts of the above type can be prepared in any of the various mechanical forms required by various types of hydroforming processes. Either before or after calcination, the catalyst can be broken into lumps or granules, or it can be ground into a fine powder, suitably for use in the suspensoid or fluidized-solids processes. Or it can be formed into pills, pellets, or other suitable shapes, preferably prior to the calcination step. In this case, the partially dried catalytic mixture is ground to a powder, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about ⅛" x ⅛" to ½" x ½" are highly satisfactory for most purposes. The shaped masses can then be hydrogen-treated and/or calcined, as set forth above.

Our invention will be more fully understood from the following specific examples:

EXAMPLE I

A high-purity alumina hydrosol containing 4.675 percent by weight $Al_2O_3$ was prepared according to the Heard technique by reacting amalgamated aluminum with dilute aqueous acetic acid. A platinum sulfide suspension was prepared by commingling aqueous ammonium sulfide with an aqueous chloroplatinic acid solution. A quantity of the alumina hydrosol weighing 46,727 grams was commingled with 5,728 milliliters of the platinum sulfide suspension, containing 13.16 grams Pt, and the mixture was poured into trays and placed in an oven at 185° F. for 16 hours, during which time it gelled and partially dried. The gel was then further dried at 350° F. and calcined at 900° F. The resulting granules were ground to pass 30 mesh, mixed with 4 percent "Sterotex" (a hydrogenated coconut oil), and formed into ⅛" by ⅛" pellets, which were heated to 900° F. for 3 hours to burn out the Sterotex. The completed catalyst contained 0.6 percent platinum, based on dry $Al_2O_3$.

A portion of this catalyst was subjected to a life test involving alternate exposure to charging stock under hydroforming conditions for twenty hours and subsequent regeneration. This test was performed with 50 cc. of the catalyst in a system comprising a reactor tube made from a 40 inch length of 1 inch, 304 stainless steel seamless tubing, the feed and product lines being constructed of ¼" to ⁹⁄₁₆" high pressure stainless steel tubing. The reactor tube was encased in an aluminum bronze (90 percent copper, 10 percent aluminum) block 4" in diameter by 30" long, the block being heated by four vertically mounted 750 watt strip heaters, two of which were always on and two regulated to give the desired block temperature. The electrically heated block was encased in a shell of 20 gauge stainless steel sheeting equipped with purge connections to provide positive pressure around the heaters, the furnace plus suitable insulation was covered with 12" diameter transite flue pipe.

The procedure in each cycle was to purge the system with nitrogen at atmospheric pressure while bringing the block temperature up to about 875–960° F., to pass hydrogen through the reactor for at least about ½ hour at that temperature but at conversion pressure of about 200 p.s.i., then to go on stream with the block at about 930° F. The average catalyst temperature was obtained by a sliding axial thermocouple and on-stream conversion temperature was held at about 922° F. The reaction product was cooled in an ice-cooled 6 foot coil of stainless steel tubing and discharged into a receiver of 2600 cc. capacity equipped with a liquid level gauge, product yield being read directly from the gauge (68 cc. per inch). The first part of the test employed naphtha A and the remainder naphtha B, the inspections of which are as follows:

|  | A | B |
|---|---|---|
| Gravity, ° A.P.I. | 57.2 | 57.2 |
| ASTM Dist., ° F.: |  |  |
| IBP | 155 | 194 |
| 10% | 222 | 214 |
| 50% | 272 | 263 |
| 90% | 336 | 324 |
| Max | 397 | 383 |
| Reid vapor pressure | 2.2 | 1.4 |
| Bromine No. | 1.3 | 3.8 |
| Weight Percent Sulfur | 0.041 | 0.025 |
| Paraffins, Percent | 46 | 51.5 |
| Naphthenes | 47 | 40.0 |
| Octane No. CFR-R | 44.6 | 47.5 |

After each on-stream period (usually 20 hours) the introduction of charge was discontinued and after a hydrogen purge, the reactor was depressured to atmospheric pressure and purged with nitrogen while the block temperature was reduced to about 825° F. Then oxygen was added to about 2 percent concentration and the flow rate was controlled to maintain the maximum (flame front) temperature at about 840° F. to 850° F.

Thus, in the hydroforming stage, Mid-Continent naphtha was contacted at about 922° F., 200 pounds per square inch gauge, 2 liquid hourly space velocity, and about 5,000 cubic feet of once-through hydrogen per barrel of feed. At the end of the 20-hour on-stream period, the carbon content of the catalyst had ordinarily reached a level of about 0.5 percent by weight. At this point the flow of charging stock and hydrogen was stopped, the reactor pressure was reduced to atmospheric, the reactor was purged with nitrogen, and the catalyst was contacted with a 2 percent mixture of oxygen in nitrogen at 825 to 850° F. for about three hours to reduce the carbon content of the catalyst below 0.1 percent by weight. The reactor was again purged with nitrogen, and the catalyst was reduced by contact with hydrogen for about 3 hours, the temperature and pressure being meanwhile gradually raised to the hydroforming level. A new cycle of hydroforming and regeneration was then started, and this procedure was continued for a long period, except as otherwise noted below. The results are plotted in FIGURE 3, where the pertinent data are indicated by the symbol "O."

During fifty of the foregoing cycles, it was observed that the catalyst showed an activity decline of about 4.0 octane numbers per thousand hours.

After approximately 500 hours on stream, the catalyst was tested in the hydroforming stage without regeneration for four 20-hour periods, and was found to have an activity-decline rate under these conditions of approximately 152 octane numbers per thousand hours. A similar test after approximately 1650 hours showed an activity-decline rate of about 270 octane numbers per thousand hours. Data from these tests are indicated in FIGURE 3 by the symbol "X." This exemplifies the increased rate of activity decline which our invention seeks to avoid.

At intervals during the foregoing tests, the twenty-hour hydroforming periods were split into two ten-hour periods, and the products from each of the split periods were separately collected and tested to determine their octane number. The resulting data offer an interesting measure of the rate of decline in catalyst activity during the on-stream period, and an excellent indication of the efficacy of our new regeneration process. We have indicated the data in FIGURE 3 by large black dots; and in FIGURE 4 we have plotted the difference in octane number of the products obtained in the first ten hours and the second ten hours against the number of the regeneration cycle as the independent variable. After seventy-six regenerations at 825° F. for two to three hours, we increased the severity of the oxidizing treatment by subjecting the catalyst to a prolonged regeneration at about 840 to 850° F. for twenty-four hours, with the results shown in FIGURE 4, where it will be observed that the prolonged regeneration produced a substantial reduction in the rate of activity decline, apparently by reducing the accumulated refractory carbon. The initial $C_5 +$ yield (first cycle) was 81 percent and CFR–R octane number was 90.1. In the 76th cycle the $C_5 +$ yield was only 75.5 and the CFR–R octane number only 87.4. The supplemental treatment of prolonged oxidation increased the yield in the following cycle (77th) to 78.3 and the octane number to 87.6 which rose in the next cycle to 88.9. Still more severe oxidizing conditions would have produced further improvement, but were not employed in this test because others desired to study the physical and chemical properties of the catalyst before it was subjected to more severe conditions.

EXAMPLE II

Four kilograms of $AlCl_3 \cdot 6H_2O$ were dissolved in 25 liters of distilled water, and the resulting solution was adjusted to pH 8 by stirring and adding a sufficient quantity of aqueous 10 percent ammonium hydroxide. A precipitate of aluminum hydroxide was formed thereby, and was separated from the aqueous liquor by filtration. The precipitate was washed by slurrying six times in 21-liter portions of distilled water at 150° F. The resulting salt-free solid was suspended in 11 liters of distilled water, and the suspension was divided into six aliquot parts, each of which contained 141 grams of $Al_2O_3$.

Titanium tetrachloride (0.83 gram) was dissolved and hydrolyzed in distilled water to form a slurry of titanium hydroxide.

A suspension of platinum sulfide was prepared by adding two milliliters of aqueous ammonium polysulfide to 112 milliliters of an aqueous solution of platinum chloride containing 0.845 gram of platinum.

The titanium hydroxide slurry was commingled with one of the aliquot portions of the alumina suspension, the platinum sulfide suspension was added thereto, and the resulting mixture was dried overnight at 185° F., then further dried at 350° F. The resulting cake was ground to pass 30 mesh, mixed with 4 percent "sterotex" (a hydrogenated coconut oil), formed into ⅛-inch pellets, and calcined in air at 900° F. for about 4 hours. The completed catalyst contained 0.25 percent by weight $TiO_2$ and 0.6 percent platinum.

A life test was thereafter carried out on a portion of this catalyst, involving alternate exposure to charging stock under hydroforming conditions for twenty hours and subsequent reactivation by oxidation and hydrogenation. In the hydroforming stage, Mid-Continent naphtha was contacted at 933° F., 200 pounds per square inch gauge, 2 liquid hourly space velocity, and about 5,000 cubic feet of one-through hydrogen per barrel of feed. During the first 20-hour on-stream period, the total $C_5$–400° F. product had a CRF–R octane number of 96. At the end of 20 to 22 hours on stream, the flow of charging stock and hydrogen was stopped, the reactor pressure was reduced to atmospheric, the reactor was purged with nitrogen, and the carbonized catalyst, containing around 0.5 percent by weight of carbon, was contacted with a 2 percent mixture of oxygen in nitrogen at 850° F. until carbon dioxide substantially disappeared from the flue gas. The reactor was again purged with nitrogen, and the catalyst was reduced by contact with hydrogen for about three hours, the temperature and pressure being meanwhile gradually raised to the hydroforming level. A new cycle of hydroforming and regeneration was then started.

During fifty of the foregoing cycles, the catalyst was observed to decline in activity at the rate of only 2.6 octane numbers per 1,000 hours. In the fifty-fifth cycle, the catalyst produced an 88 CRF–R octane number product under the defined conditions.

At the end of approximately 500 hours on stream, the catalyst was tested continuously in the hydroforming stage for several twenty-hour periods without regeneration. During this test, the catalyst showed an activity decline rate of approximately 65 octane numbers per thousand hours. A similar test after approximately 1150 hours gave a decline rate of approximately 180 octane numbers per thousand hours. This loss of catalyst activity, increase in catalyst activity decline rate and loss of catalyst selectivity (yield) can in large measure be overcome by the periodic use of the above defined supplemental oxidation under more severe conditions to remove accumulated refractory carbon from the catalyst.

While we have described our invention with reference to certain specific embodiments thereof, it will be recognized that the said embodiments are illustrative only and not intended to be limitations on the scope of our invention. Our invention can, of example, be carried out in a multiplicity of steps, including an initial step or steps for the mild oxidation of the deactivated catalyst, and a subsequent step or steps for the further oxidation thereof under the more severe conditions defined hereabove. Our invention is applicable broadly to the regeneration of the platinum-containing hydroforming catalysts, and it is to be understood that any modifications or equivalents that would ordinarily occur to one skilled in the art are to be considered as lying within the scope of our invention.

In accordance with the foregoing description, we claim as our invention:

1. The method of restoring the activity level of a supported platinum catalyst which has become gradually deactivated over a plurality of cycles of hydroforming and reactivation wherein the reactivation in each cycle is effected after the carbon content of the catalyst has reached 0.1 percent by weight but before it exceeds 1 percent by weight by treatment with a gas mixture containing more than about 0.5 and less than about 10 percent of oxygen at a temperature above 750° F. but below 900° F., and wherein the residual carbon content of the catalyst after each reactivation is greater than the carbon content after the preceding reactivation, so that the carbon content of the reactivated catalyst accumulates from cycle to cycle to a level of about 0.05 to 0.1 percent by weight, which method comprises subjecting said catalyst after said plurality of cycles to a first oxidative treatment with a gas mixture containing more than about 0.5 and less than about 10 percent of oxygen at a temperature above about 750° F. but below 900° F. for a period of time sufficient to reduce the carbon level to not more than about 0.1 percent by weight, then subjecting the catalyst to a second oxidative treatment with a gas mixture containing a greater concentration of oxygen at a higher temperature below about 925° F. to substantially eliminate accumulated carbon therefrom, and contacting the treated catalyst with a hydrogen-containing gas at a temperature within the hydroforming range.

2. The method of maintaining a supported platinum catalyst at high activity over a prolonged sequence of hydroforming and reactivation steps, said hydroforming steps being carried out at a pressure below about 500 pounds per square inch, which method comprises contacting a naphtha charging stock with said catalyst in the presence of hydrogen at a temperature in the range of about 800 to 1000° F. and a pressure of at least 50 but less than 500 pounds per square inch until the carbon content of the catalyst exceeds 0.1 percent by weight but does not exceed 1 percent by weight, removing said catalyst from hydroforming conditions and purging hydrocarbons therefrom, reactivating the catalyst by contact with a gas mixture containing more than about 0.5 and less than about 10 percent of oxygen at a temperature greater than about 750° F. but less than 900° F., whereby most of the carbonaceous material deposited in the preceding hydroforming period is burned off, leaving a small proportion of more difficultly oxidizable carbon which accumulates from cycle to cycle, reducing the catalyst after each reactivation period before the hydroforming step is resumed, and periodically, after a plurality of such cycles, subjecting the catalyst to further oxidation with a gas mixture containing a greater concentration of oxygen at a higher temperature below about 925° F. for a period of time sufficient to remove substantially all accumulated oxidizable carbon.

3. A regenerative process of hydroforming naphtha with a platinum-on-alumina catalyst which comprises hydroforming naphtha in the presence of hydrogen at a pressure above 50 but below 500 p.s.i. at a temperature in the range of 800 to 1000° F. in on stream periods of short duration to prevent large buildup of carbonaceous deposits on the catalyst, purging the catalyst after each on stream period and then regenerating it to effect substantial removal of combustible carbonaceous deposits by effecting combustion of said deposits by contacting said catalyst with a gas containing about .5 to 20 percent of oxygen at a pressure of atomspheric to 500 p.s.i., a temperature of about 750 to 900° F. with an oxygen partial pressure in the range of .1 to 100 p.s.i. and for a time of at least .2 to 5 hours, whereby refractory carbon gradually accumulates on the catalyst during a large number of on stream and regeneration cycles, thereby causing a gradual decline in the activity and an increase in the activity decline rate of the catalyst in the absence of further treating, further treating the catalyst after a regeneration step by contacting the regenerated catalyst under more severe oxidizing conditions than employed in the regeneration step, said further treating step including contacting the catalyst with an oxygen-containing gas at a temperature at least 25° F. higher than that employed in the regeneration step, but not substantially above 925° F. for a time sufficient to remove substantially all the accumulated refractory carbon from the catalyst and contacting the treated catalyst with a hydrogen-containing gas at a temperature within the hydroforming range.

4. The method of claim 3 wherein the on stream periods are sufficiently short to prevent the accumulation of carbonaceous deposit on the catalyst from substantially exceeding about 1 percent by weight and wherein the treating step is effected after the carbonaceous deposits have been removed to less than .1 percent by weight by said regeneration.

5. The method of claim 3 wherein the duration of the on stream periods for at least a part of the catalyst is not more than about 1 day in each on stream period.

6. The method of treating a deactivated, carbon-containing, platinum-alumina hydroforming catalyst which has been subjected to many regenerations with a dilute air stream and has gradually accumulated residual carbon whereby its activity is impaired, which method comprises subjecting said deactivated catalyst to a mild oxidative regeneration by contacting said catalyst with a gas stream comprising about 0.5% to about 10% oxygen at a temperature in the range of about 750° F. to 900° F. for a period of time sufficient to remove readily combustible carbon and then removing substantially all the residual carbon by subjecting the catalyst to treatment at a temperature in the range from about 800 to 925° F. with an oxygen-containing gas under more severe conditions than employed in said regeneration for a period of time of at least about 10 minutes and sufficient to remove substantially all residual carbon, which method of treatment minimizes the accumulation of residual carbon on said catalyst.

7. The method of claim 6 in which the carbon-containing catalyst prior to said mild oxidative regeneration contains at least .1 but less than 1 percent by weight of carbon.

8. A method of treating a deactivated, carbon-containing platinum-alumina hydroforming catalyst which has been subjected to many regenerations with a dilute air stream and has gradually accumulated residual carbon whereby its activity is impaired, which method comprises subjecting said deactivated catalyst to a first oxidative treatment at a temperature in the range of about 750° to 900° F. with a gas mixture containing more than about 0.5 and less than about 10 percent of oxygen for a period of time sufficient to remove readily combustible carbon, and then removing substantially all the residual carbon by subjecting the catalyst to a second oxidative treatment with a gas mixture containing a greater concentration of oxygen at a higher temperature below about 925° F. for a period of time of at least about 15 minutes and sufficient to remove substantially all residual carbon, which method of treatment minimizes the accumulation of residual carbon on said catalyst.

9. A method of treating a deactivated, carbon-containing, platinum-alumina hydroforming catalyst which has been subjected to many regenerations with a dilute air stream and has gradually accumulated residual carbon whereby its activity is impaired, which method comprises subjecting said deactivated catalyst to a first oxidative treatment with a gas mixture containing more than about 0.5 and less than about 10 percent of oxygen at a temperature in the range of about 750 to 900° F. for a period of time sufficient to remove readily combustible carbon, and then removing substantially all the residual carbon by subjecting the catalyst to a second oxidative treatment with a gas mixture containing free oxygen under more severe oxidizing conditions than are employed in the first oxidative treatment, said second oxidative treatment being at a carbon-burning temperature not substantially higher than 925° F. for a period of time of at least about 15 minutes and sufficient to remove substantially all residual carbon, which method of treatment minimizes the accumulation of residual carbon on said catalyst.

10. In a regenerative reforming process wherein a supported platinum reforming catalyst is contacted with a naphtha in the presence of hydrogen under suitable reforming conditions such that a reformed product is obtained, but wherein said catalyst becomes contaminated with carbonaceous material so that its activity is impaired, and wherein said contaminated catalyst is subjected to regeneration comprising contacting said contaminated catalyst with a gas stream containing about 0.5% to about 10% oxygen at a temperature below about 900° F. for a period of time sufficient to remove readily combustible carbon therefrom, but wherein residual carbon gradually accumulates on said catalyst thereby causing a gradual decline in the activity and an increase in the activity decline rate of said catalyst in the absence of further treating, the improvement which comprises periodically subjecting said catalyst to a supplemental treatment with an oxygen-containing gas under more severe oxidizing conditions than employed in said regeneration, said more severe oxidizing conditions including a higher temperature, between about 800° F. and about 925° F., for a period of at least 10 minutes and sufficient to remove substantially all residual carbon, whereby the accumulation of residual carbon on the catalyst is minimized.

11. The process of claim 10 wherein said reforming catalyst comprises platinum-on-alumina.

References Cited
UNITED STATES PATENTS

| | | | |
|---|---|---|---|
| 2,641,582 | 6/1953 | Haensel | 196—50.2 |
| 2,664,404 | 12/1953 | Blatz et al. | 196—50.2 |
| 2,761,820 | 9/1956 | Snuggs et al. | 196—50.2 |
| 3,011,968 | 12/1961 | Webb | 208—140 |

DELBERT E. GANTZ, *Primary Examiner.*

JAMES S. BAILEY, ALLAN M. BOETTCHER,
*Examiners.*

A. RIMENS, J. E. DEMPSEY, H. LEVINE,
*Assistant Examiners.*